United States Patent
Higgins

[19]

[11] Patent Number: 5,901,498
[45] Date of Patent: May 11, 1999

[54] TREE INJECTOR

[75] Inventor: Andrew William Higgins, Hamilton, New Zealand

[73] Assignee: Simcro Tech Limited, Hamilton, New Zealand

[21] Appl. No.: 08/779,039

[22] Filed: Jan. 6, 1997

[30] Foreign Application Priority Data

Jan. 5, 1996 [NZ] New Zealand ............................ 280789

[51] Int. Cl.⁶ .................................................. A01G 29/00
[52] U.S. Cl. ............................ 47/57.5; 47/1.01; 111/7.1; 111/7.3; 111/7.4; 111/118
[58] Field of Search .............................. 111/7.1, 7.3, 7.4, 111/118; 47/1.01 R, 57.5

[56] References Cited

U.S. PATENT DOCUMENTS 4,705,218   11/1987   Daniels ..................................... 239/271
5,727,484   3/1998   Childs ........................................ 111/7.1

FOREIGN PATENT DOCUMENTS 34246   11/1905   Hungary ................................. 111/7.1
54807   1/1912   Hungary ................................. 111/7.4

*Primary Examiner*—Thomas B. Will
*Assistant Examiner*—Arpad Fabian Kovacs
*Attorney, Agent, or Firm*—Young & Thompson

[57] ABSTRACT

A cylinder 16 has a piston 19 slidable therein, to force liquid from the cylinder out through a hollow needle 18. A pair of handles 11 extend outwardly from the cylinder, substantially normal thereof. Each handle carries a lever 30 pivoted thereon. In use, movement of the piston is less than the corresponding movement of a manually operable portion 32 (FIG. 1).

13 Claims, 2 Drawing Sheets

TREE INJECTOR

BACKGROUND

This invention relates to tree injectors. It is already known to inject liquids into a tree at or inside the region of the junction of the living interior of the truck and the outer dead material ie. the bark. Inside the bark is cambium tissue where radial growth of the tree trunk occurs. The outer layer of cambium tissue consists primarily of a phloem layer through which water passes downwards, the water containing food from the leaves. The cambium tissue also includes a xylem layer inside the phloem. Soil water rises up through the xylem tissue layer, carrying minerals and other material from the soil.

Trees are prone to damage from pests such as insects and fungus particularly entering through the bark. Such pests can be resisted by suitable pesticides or fungicides fed into the cambium so as to pass therein up or down the tree trunk, as required.

OBJECT

It is one object of the present invention to provide an improved tree injector.

STATEMENT OF THE INVENTION

According to one aspect of the present invention there is provided a tree injector including a cylinder means, a liquid outlet feed from the cylinder means to a hollow needle holder, a liquid inlet feed to the cylinder means, a piston means co-acting with the cylinder means to displace liquid from the cylinder means through the outlet feed when the piston means is operated and manually operable lever mechanism connected to move the piston means through a smaller distance than the corresponding distance of movement of a manually operable part of the lever.

According to another aspect of the present invention there is provided a tree injector including a cylinder means, a liquid outlet feed from the cylinder means to a hollow needle holder, a liquid inlet feed to the cylinder means, a piston means co-acting with the cylinder means to displace liquid from the cylinder means through the outlet feed when the piston means is operated and two handles each operable by a different hand, the handles being fastened to the tree injector with the longitudinal axis of each handle substantially normal to the longitudinal axis of a needle in said holder.

Preferably the piston means is slidable in the cylinder means.

Conveniently the handles are coaxial and extend from opposite sides of the tree injector.

Advantageously the handle axes pass through or close to the longitudinal axis of the cylinder means.

Preferably the lever mechanism is mounted with said manually operable part thereof adjacent the or one of the handles.

Conveniently two lever mechanisms are provided the manually operable parts thereof being each adjacent one of the handles.

Advantageously the lever mechanism is pivoted to the handle.

Preferably the lever mechanism is connected to the piston or to a member slidable therewith by means of a link pivoted at one end to the lever means and at the other end to the piston or said member.

BRIEF DESCRIPTION OF THE DRAWINGS

One embodiment of the invention is described by way of example only, with reference to the accompanying drawings, in which.

DESCRIPTION OF THE PREFERRED EMBODIMENTS

Figure 1:
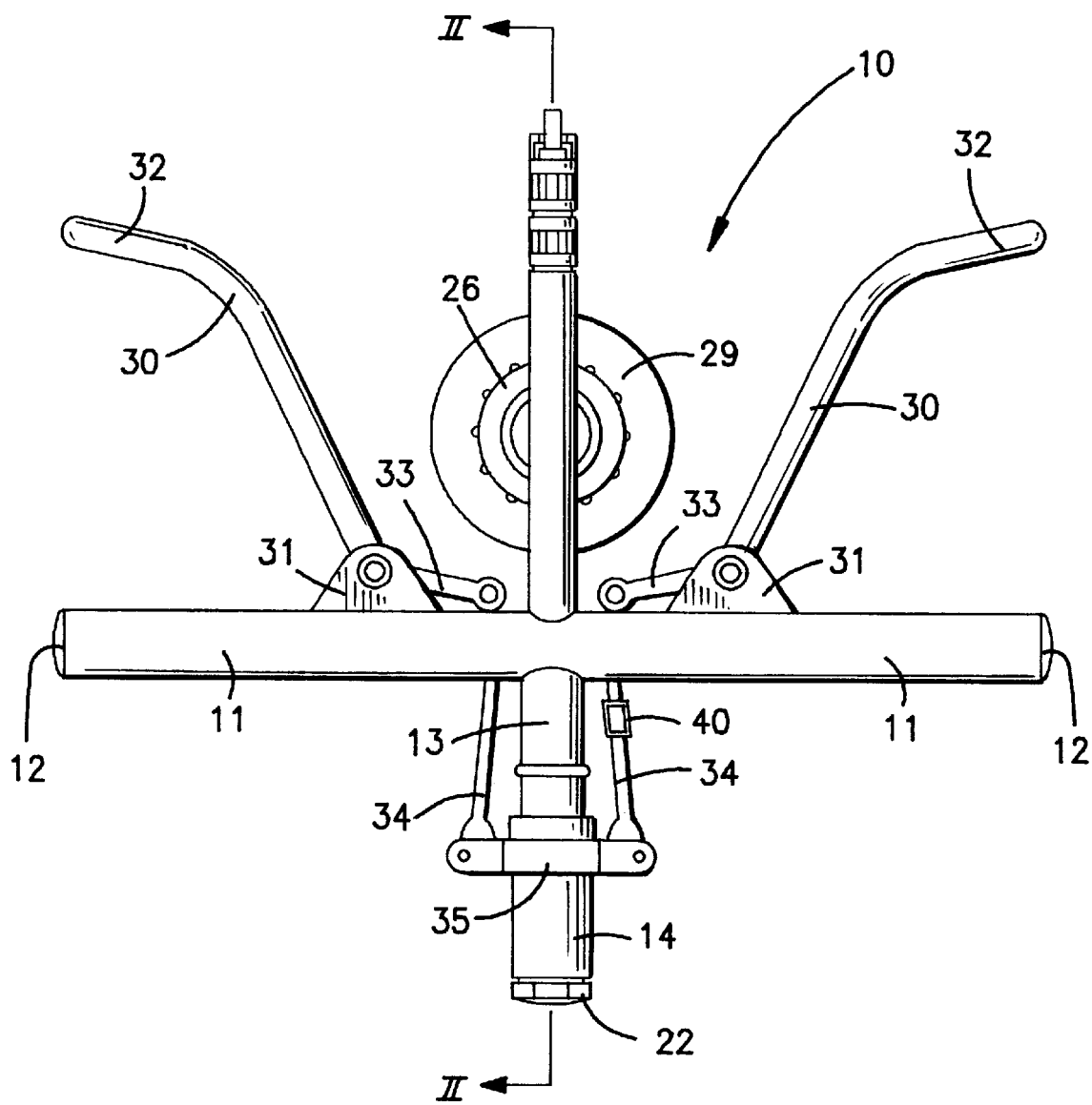
FIG. 1 is an underside view of a tree injector, according to the invention.

In the drawings, a tree injector 10 includes a pair of co-axial handles 11, conveniently formed of a length of robust thick-walled metal tube closed at each end by caps 12. In the center of the handles 11 and normal thereto, there is fastened, as by brazing, one end of an inner sleeve 13. An outer sleeve 14 is a free sliding fit on the other end of the inner sleeve 13 and is also closed by a cap 15.

A length of tube forming a cylinder 16 is fastened firmly in said one end of the inner sleeve 13. The cylinder 16 extends through the handles 11 and ends with a holder or clamp 17, of known kind, to hold and seal a tubular needle 18.

The needle 18 has a sharp end and is of diameter, stiffness and form suitable to withstand the high forces and pressures imposed when the needle 18 is forced axially through the bark of a tree and part way into the cambium thereof.

Figure 2:
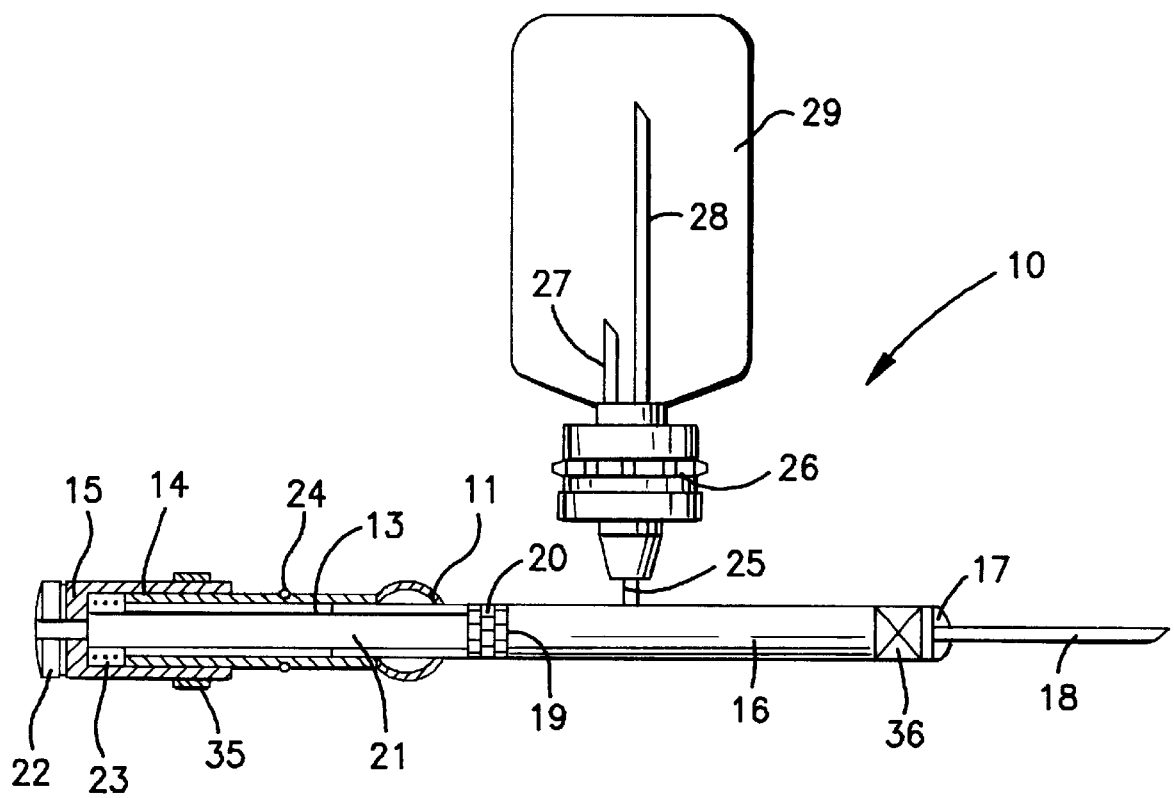
FIG. 2 is a section along the line II—II in FIG. 1.

Within the cylinder 16 a piston 19 is a close sliding fit and is sealed to the cylinder by a suitable seal 20, such as an O-ring and/or a lip seal. The piston 19 is mounted on one end of a piston rod 21, the other end of which is fastened to the cap 15 of the outer sleeve 14 by a nut 22. A pre-compressed spring 23 typically acting between the cap 15 and the adjacent end of the inner sleeve 13, urges the piston 19 (and parts attached thereto) towards the left in FIG. 2.

Movement of the piston 19 towards the right is limited by the end of the outer sleeve 14 reaching a spring ring 24 partly located in a groove in the outside of the inner sleeve 13.

Between the piston 19 and the needle holder 17, a feed is provided into the cylinder 16, for liquid which is to be injected into the tree through the needle 18. The feed is typically in the form of a passage 25 opening into the cylinder 16. The passage 25 extends through a threaded fastener 26 to the shorter of a pair of parallel tubular needles 27, 28. The longer needle 28 is vented to atmosphere.

In use, a bottle 29 containing the liquid is sealed by a rubber-like diaphragm, in known manner. The bottle is inverted and the needles 27, 28 inserted into the bottle 29 by piercing the diaphragm. The neck of the bottle 29 is fastened to the tree injector 10 by the threaded fastener 26. The liquid drains from the bottle through the shorter needle 27 to fill the cylinder 16. Liquid displaced is replaced by air entering the bottle 29 through the longer needle 28. The fastener 26 may have part of its ring-form cut away to provide a gap through which the neck of the bottle 29 may pass.

As shown particularly in FIG. 1, a pair of substantially identical levers 30 are pivoted on brackets 31 affixed to the handles 11, on opposite sides of the cylinder 16.

The levers 30 have longer, outwards hand-operable portions 32 and shorter inner portions 33. The ends of the portions 33 are pivoted to links 34, the other ends of which are pivoted to brackets 35 fastened on the outside of the outer sleeve 14. One or both of the links 34 may have a threaded length-adjuster 40.

To push the needle 18 into the tree, the operator pushes on the handles 11 with both hands. This provides a symmetrical strong axial force on the needle 18, with minimal side force or bending moment. Still holding the handles 11, the operator wraps the fingers of both hands round the lever portions 32 and squeezes the portions 32 towards the handles 11. This pulls the links 34, outer sleeve 14, piston rod 21 and piston 19 towards the right in FIG. 2, ejecting the liquid in the cylinder 16 out through the needle 18 until the spring ring 24 is reached. Thereby, a measured quantity of the liquid is ejected through the needle 18.

When the lever portions 32 are released, the spring 23 restores the moving parts to the left until the ends of the short lever portions 33 reach the handles 11. A suitable type of non-return valve 36 prevents air being drawn in through the needle 18.

I claim:

1. A tree injector comprising a cylinder with a liquid outlet feed to a hollow needle holder and a liquid inlet feed, a piston co-acting with the cylinder to displace liquid from the cylinder through the outlet feed when the piston is operated and a manually operable lever mechanism that moves the piston through a smaller distance than the corresponding distance of movement of a manually operable part of the lever mechanism, the lever mechanism being connected to the piston with an adjustable length link pivoted at one end to the lever mechanism and pivoted at another end to one of the piston and a member slidable therewith.

2. A tree injector as claimed in claim 1 including two handles each operable by a different hand, the handles being fastened to the tree injector with the longitudinal axis of each handle substantially normal to the longitudinal axis of a needle in said holder.

3. A tree injector as claimed in claim 1 in which the piston is slidable in the cylinder.

4. A tree injector as claimed in claim 2 in which the handles are coaxial and extend from opposite sides of the tree injector.

5. A tree injector as claimed in claim 4 in which the handle axes pass through or close to the longitudinal axis of the cylinder.

6. A tree injector as claimed in claim 2 in which the lever mechanism is mounted with said manually operable part thereof adjacent the or one of the handles.

7. A tree injector as claimed in claim 2 in which two lever mechanisms are provided the manually operable parts thereof being each adjacent one of the handles.

8. A tree injector as claimed in claim 6 in which the lever mechanism is pivoted to the handle.

9. A tree injector comprising:

a hollow tube for holding a fluid to be injected, one end of said tube having a hollow injector;

a movable piston inside said tube for ejecting the fluid from said injector when said piston is moved;

a movable sleeve on an exterior surface of said tube, said sleeve being attached to and movable with said piston;

a handle attached to said tube generally perpendicular thereto;

at least one movable arm pivotally attached to said handle; and a link pivotally connecting said arm to said sleeve so that said piston moves a smaller distance than said arm when said arm is moved.

10. The injector of claim 9, wherein said arm is pivotally connected to said handle between a relatively long portion of said arm extending away from said tube which is manually operable to move said piston and a relatively short portion of said arm extending toward said tube.

11. The injector of claim 10, wherein said link is connected to a distal end of said short portion of said arm.

12. The injector of claim 9, further comprising a fluid inlet in a side of said tube.

13. The injector of claim 9, further comprising a spring inside said sleeve between an interior end of said sleeve and said tube for urging said tube away from the interior end of said sleeve.

\* \* \* \* \*